United States Patent
Juillard

(10) Patent No.: US 11,270,438 B2
(45) Date of Patent: Mar. 8, 2022

(54) SYSTEM AND METHOD FOR TRIGGERING MACHINE LEARNING (ML) ANNOTATION MODEL RETRAINING

(71) Applicant: Samasource Impact Sourcing, Inc., San Francisco, CA (US)

(72) Inventor: Loic Juillard, Novato, CA (US)

(73) Assignee: Samasource Impact Sourcing, Inc., San Francisco, CA (US)

( * ) Notice: Subject to any disclaimer, the term of this patent is extended or adjusted under 35 U.S.C. 154(b) by 0 days.

(21) Appl. No.: 17/145,292

(22) Filed: Jan. 9, 2021

(65) Prior Publication Data
US 2021/0390702 A1    Dec. 16, 2021

Related U.S. Application Data

(60) Provisional application No. 63/038,358, filed on Jun. 12, 2020.

(51) Int. Cl.
*G06T 7/11*    (2017.01)
*G06T 11/60*   (2006.01)
(Continued)

(52) U.S. Cl.
CPC .................. *G06T 7/11* (2017.01); *G06T 7/12* (2017.01); *G06T 7/90* (2017.01); *G06T 11/60* (2013.01);
(Continued)

(58) Field of Classification Search
CPC ..... G06T 7/11; G06T 7/12; G06T 7/90; G06T 11/60; G06T 2200/24; G06T 2207/20081
See application file for complete search history.

(56) References Cited

U.S. PATENT DOCUMENTS 7,792,353 B2    9/2010  Forman et al.
10,102,429 B2  10/2018  Schnittman
(Continued)

OTHER PUBLICATIONS

Roman, Victor, "How to develop a machine learning model from scratch", https://towardsdatascience.com/machine-learning-general-process.
(Continued)

*Primary Examiner* — David T Welch
(74) *Attorney, Agent, or Firm* — Law Office of Gerald Maliszewski; Gerald Maliszewski

(57) ABSTRACT

Systems and methods are presented for triggering machine learning (ML) annotation model retraining. The method includes an annotation model accepting raw data images with undefined variations of a first shape with a coarse boundary surrounding a first shape. The annotation model creates an annotated image with annotation marks forming a refined boundary surrounding the first shape. An agent user interface (UI) modifies the refined boundaries to supply corrected images. A mediation software application compares the annotated images to corresponding corrected images, and supplies an annotation model retraining resource analysis for the first shape in response to comparing the annotated images to the corrected images. The step of comparing the annotated images to the corrected images may include the mediation application measuring the number of points changed in the refined boundaries to supply the corrected images, and the time required by the human agent to change the points.

25 Claims, 7 Drawing Sheets

(51) Int. Cl.
  *G06T 7/90* (2017.01)
  *G06T 7/12* (2017.01)
(52) U.S. Cl.
  CPC  *G06T 2200/24* (2013.01); *G06T 2207/20081* (2013.01)

(56) References Cited

U.S. PATENT DOCUMENTS

| | | | |
|---|---|---|---|
| 10,482,603 B1* | 11/2019 | Fu | G06F 17/15 |
| 10,614,056 B2 | 4/2020 | Ignatyev | |
| 2012/0230572 A1* | 9/2012 | Kohlberger | G06K 9/6209 |
| | | | 382/131 |
| 2018/0276841 A1* | 9/2018 | Krishnaswamy | G06K 9/00671 |
| 2019/0139221 A1* | 5/2019 | Castro-Gonzalez | |
| | | | A61B 5/6826 |
| 2019/0205638 A1* | 7/2019 | Zhang | G06N 3/08 |
| 2020/0141753 A1* | 5/2020 | Li | G01C 21/3841 |
| 2020/0311541 A1 | 10/2020 | Cmielowski | |
| 2021/0158549 A1* | 5/2021 | Veeravasarapu | G06T 3/0093 |
| 2021/0279884 A1* | 9/2021 | El-Zehiry | G06N 3/08 |
| 2021/0319264 A1* | 10/2021 | Shabtay | G06K 9/6232 |

OTHER PUBLICATIONS

Pagani, Luca et al., "Curvature based sampling of curves and surfaces" Computer Aided Geometric Design 59 (2018) pp. 32-48.

* cited by examiner

SYSTEM AND METHOD FOR TRIGGERING MACHINE LEARNING (ML) ANNOTATION MODEL RETRAINING

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to machine learning (ML) systems and, more particularly, to systems and methods for efficiently triggering the retraining of ML annotation models.

2. Description of the Related Art

Previously, human annotators were often tasked with creating masks over specific areas of a given image, thus identifying the underlying pixels as belonging to a particular object instance (instance segmentation) or, more generally, a region of interest (semantic segmentation). This was done by painting pixels pertaining to the region of interest with a chosen color, a rather lengthy process. Today, most annotation interfaces include a polygon tool that allows the annotator to trace the contour of a region of interest from which the mask is to be extracted, thus making the segmentation task significantly more efficient.

When developing an ML model, a training dataset is created containing images representative of the environment in which the model is operating. A training dataset is a set of images and associated annotations. An annotation is a form of marking the image where features of interest (e.g., objects or scenes) are highlighted in the picture. The training dataset is typically annotated by humans. There is a correlation between ML model annotation accuracy and training data annotation accuracy, so annotation precision is essential during the training stage. When finally trained on the training dataset, the ML model is ready to begin annotation of a selected feature.

Each customer project (annotation feature) is not static. A customer tends to send batches of data collected in different environments or with different sensors without particular instructions. For example, a customer may send a batch of data consisting of highway images taken during the day, with the next series of data being a set of night pictures taken in a city, or a set of data taken with a different lens, etc. Thus, customers do not always communicate changes with their data submissions, and therefore do not always understand that resulting impact on annotation quality or time. Further, customers may also change the annotation instructions during a project. For example, they may start with road scenes requesting annotations of cars, including the mirrors. Later on in the project, they may have realize that the mirrors create false positives, so they change their annotation instructions to no longer include the mirrors. This poses two issues: for one, the customer must generate an official project requirement change, which is not always as easy as it might seem. Second, each and every annotating agent on the project must be made aware of the change, which can be difficult if there are, for example, 600-1000 agents.

Thus, changes in data cause problems associated with machine-assisted annotation services. Because these services are finely turned on customer data used for initial training, changes in the data environment (called data shift) makes the model used for the machine assisted annotation inefficient.

To solve this problem, an adaptive approach to model training is needed. One option is to rely on customers to identify data shifts, so that the annotation model can be retrained using new content. The issue with this option is that customers are typically not able to estimate the level of changes between datasets and therefore are unable to determine if, in fact, the new datasets constitute an environment change requiring retraining of the model.

It would be advantageous if the efficiency of a ML annotation model could be measured and compared to retraining costs, so as to provide a trigger initiating retraining of the model.

SUMMARY OF THE INVENTION

Disclosed herein are systems and methods to determine if shifts in a data environment being annotated create sufficient inefficiencies to justify the retraining of a machine learning (ML) annotation model. The model degradation of annotation performance is measured throughout the life of a project. A performance baseline is established with a first set of data and a supervising service monitors the project performance, creating a stimulus if retraining is required. Described herein are the type of metrics and the logic implemented to trigger (or not) the retraining, with the stimulus information to efficiently and accurately retrain the model.

Accordingly, a method is presented for triggering ML annotation model retraining. The method includes a ML annotation model accepting raw data images. Each raw data image includes an undefined variation of a first shape with a coarse boundary surrounding a first shape formed from a first number of points. The annotation model creates an annotated image, forming a refined boundary surrounding the first shape with a second number of points greater than, or equal to the first number. A human agent user interface (UI) modifies the refined boundaries, if necessary, to supply corrected images. A mediation software application compares the annotated images to corresponding corrected images, and supplies an annotation model retraining resource analysis for the first shape in response to comparing the annotated images to the corrected images. The step of comparing the annotated images to the corrected images may include the mediation application measuring the number of points changed in the refined boundaries to supply the corrected images, and the time required by the human agent to change the points.

Typically, the method begins with the UI accepting a plurality of raw data images, and then supplying the raw data images with the coarse boundaries surrounding the first shape to the annotation model. In one aspect, the annotation model accepts the first number of points and adds segments connecting the points to supply coarse boundaries with segments.

In another aspect, the UI may supply raw data images to the annotation model including undefined variations of a second shape and shape commands for selecting the second shape for annotation. In this example, the raw data images may include both the first and second shapes, or just the second shape. Then, the annotation model supplies annotated images with annotation marks forming a refined boundary surrounding the second shape variation. The UI supplies corrected images for the second shape, and the mediation application supplies retraining resource analysis for the second shape in response to comparing the annotated images to the corrected images.

In another aspect, the UI accepts refined boundary modifications to corresponding annotated images from a plurality of human agents, and the mediation application compares the annotated images to the corrected images, cross-referenced to each human agent. Further, the mediation application may compare the annotated images to the corrected images, cross-referenced to human agents clustered together based upon a selected characteristic such as general annotation experience or annotation experience with a particular shape. The comparison of annotated images to the corrected images may include the mediation application creating annotation time regression parameters based upon shape as measured over a first duration of time, which may be normalized by time per point change to create an annotation time series prediction.

The mediation application may grade annotation time series predictions based upon factors including improved efficiency per first duration of time, consistent efficiency per first duration of time, and decreased efficiency per first duration of time, and only provide the annotation model retraining resource analysis for the decreased efficiency predictions. The mediation application supplies the retraining resource analysis by comparing costs associated with retraining a current annotation model to the cost of human agents supplying the corrected images using the current annotation model. More explicitly, the mediation application calculates a return on investment (ROI) by using the annotation time series predictions to determine a cost difference between using the current annotation model and a retrained annotation model, as amortized over the remaining annotation project, and comparing the cost difference to the cost of retraining the current annotation model.

Addition details of the above-described method and an associated system for triggering ML annotation model retraining are provided below.

DETAILED DESCRIPTION

Figure 1:
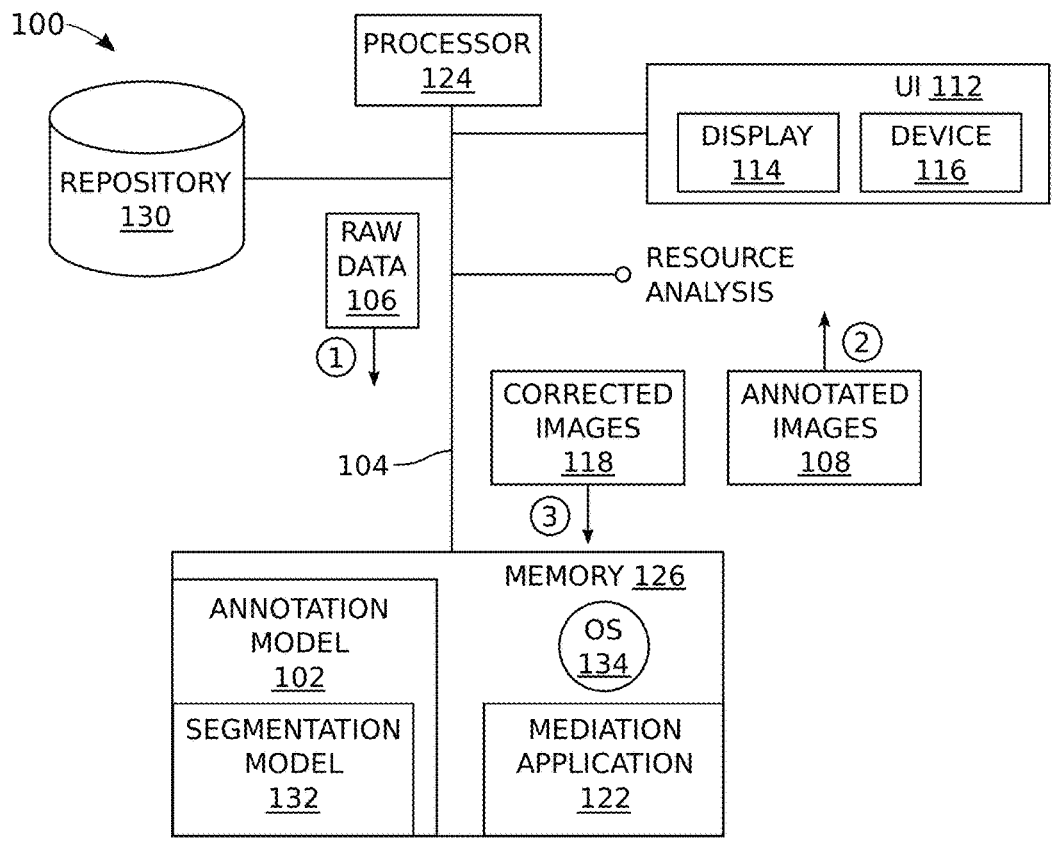
FIG. 1 is a schematic block diagram of a system for triggering machine learning (ML) annotation model retraining.

FIG. 1 is a schematic block diagram of a system for triggering machine learning (ML) annotation model retraining. The system 100 comprises a ML annotation model 102 having an interface on bus line 104 to accept a plurality of raw data images 106. The annotation model is a software application, stored in a non-transitory memory and enabled as sequence of processor executable steps for creating annotated images. Typically, the raw data images are two-dimensional still images, but they may also be three-dimensional (3D) point cloud or 3D vector data, or video content. Each raw data image includes an undefined variation of a first shape with a coarse boundary surrounding a first shape formed from a first number of points. The annotation model 102 supplies annotated images 108 with an annotation marks at an interface on line 104, where the annotation marks form a refined boundary surrounding the first shape with a second number of points greater than, or equal to the first number. Some examples of an annotation marks include a raster mask, bounding box, polygon, key point annotation, vector annotation, line, semantic segmentation (a type of raster), and instance semantic segmentation (another type of raster). For a bounding box the coarse boundary may be a set of points encompassing an object. For polygons the coarse boundary may be a list of coordinates (points of the polygon). For segmentation the coarse boundary may be an image file containing pixel masks of the shape being annotated, similar in concept to a transparent page being superimposed on the raw data image shape. As described in more detail below, the annotation model 102 may concatenate a heatmap from colors within the coarse boundary, match the heatmap to a selected segmentation model, and convert the selected segmentation model into annotation marks (e.g., a raster mask).

A human agent user interface (UI) 112 comprises a display 114 having an interface on line 104 to accept and present the annotated images 108, and a device 116 accepting human agent modifications to the refined boundaries, supplying corrected images 118 supplied on line 104. Device 118 may include a keypad, mouse, touchpad, touchscreen, trackball, stylus, or cursor direction keys, and voice-activated software, to name a few examples.

Generally, a ML annotation model attempts to reduce the number of clicks a human annotator has to perform. If a model shows improvements, it is often assumed that the final annotation marks produced by the ML model is sufficiently accurate. In a production environment, this is rarely the case. Typically, the level of annotation quality required cannot be achieved by a ML approach alone. However, ML annotation should provide an accurate starting point that can then be corrected by a human agent, thus achieving true Augmented Intelligence (AI).

Definitions

Binary Raster Mask

For an image of width W and height H, a binary raster mask of a given region of interest can be established (e.g., object instance) by creating a single channel overlay of size W×H where pixels covering the region of interest have a value of 1 while everywhere else the value is 0. The region of interest is essentially highlighted in the foreground while the rest of the image stays in the background.

Gaussian Kernel

A kernel refers to a small patch (or window) of width w and height h that is typically convolved with a larger image of width W and height H. A Gaussian kernel's "pixel" values are sampled from a normal distribution centered on the kernel's centroid. Gaussian kernels may be used to smooth the binary mask by averaging each pixel with its nearest neighbors.

Marching Squares Algorithm

The algorithm finds iso-contours (contours where the value is constant) on a two dimensional heatmap. For instance, elevation contours on a topographic map are height iso-contours and can be drawn using matching squares.

Regular Stride

A regular stride refers to a stride having a constant value. For example, starting from 0, a regular stride of 3 gives all even numbers whereas the same stride starting from 1 gives odd numbers.

Local Curvature

The local curvature of three points can be established as the inverse of the radius R of its circumscribed radius.

For example, a trained ML annotation (segmentation) model produces a pixel mask for a given region of interest that is converted to a polygonal outline (refined boundary), or closed path of connected vertices, as this is known to be a human-centric representation. However, humans tend to produce sparse paths, being parsimonious when creating extra vertices. Unexpectedly, experimentation has found that this sparsity is very important. Indeed, the more vertices provided, the more cumbersome it becomes to edit the polygonal figure as the action space becomes quite vast. Thus, a "mask to sparse polygon" conversion method produces truly human-centric annotations.

Figure 2:
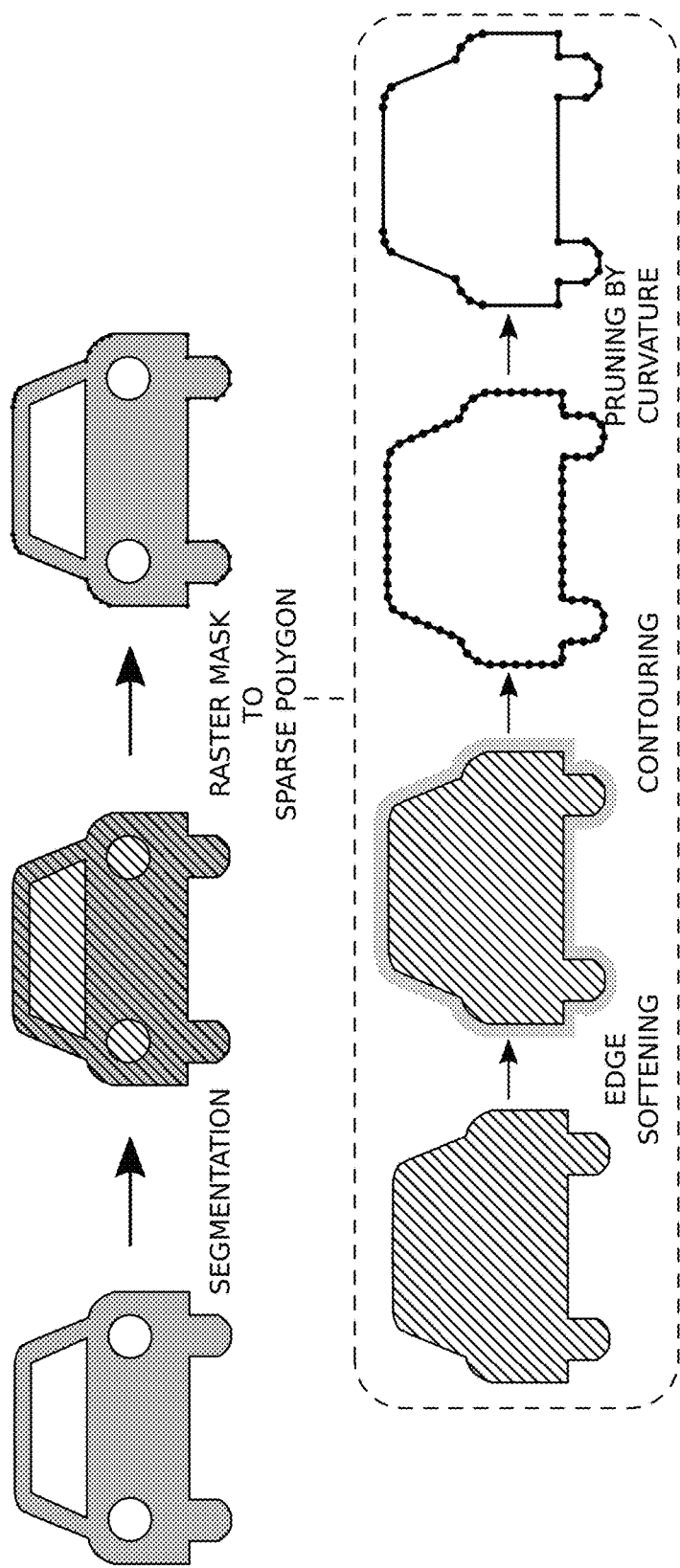
FIG. 2 depicts steps in converting a raster mask to a closed path sparse polygon.

FIG. 2 depicts steps in converting a raster mask to a closed path sparse polygon. First, the edges of the mask M are blurred using a Gaussian kernel of window size k and standard deviation σ. Second, a closed path is found corresponding to an iso-contour C at intensity I using the Marching Squares algorithm. Third, the closed path is subsampled using a regular stride s. Fourth, the closed path is pruned (sparsified) by computing the local curvature κ and then removing points below a threshold value κ threshold.

Figure 3:
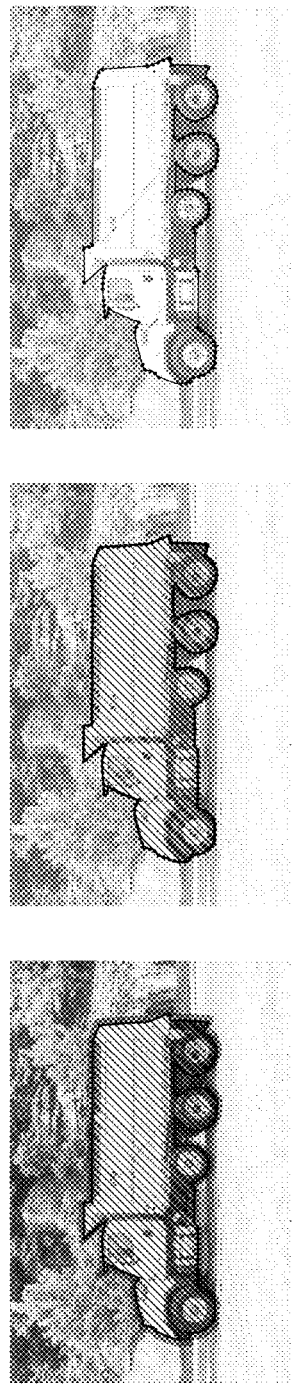
FIG. 3 depicts the above-described raster mask conversion process as applied to a real image.

FIG. 3 depicts the above-described raster mask conversion process as applied to a real image.

Figure 4:
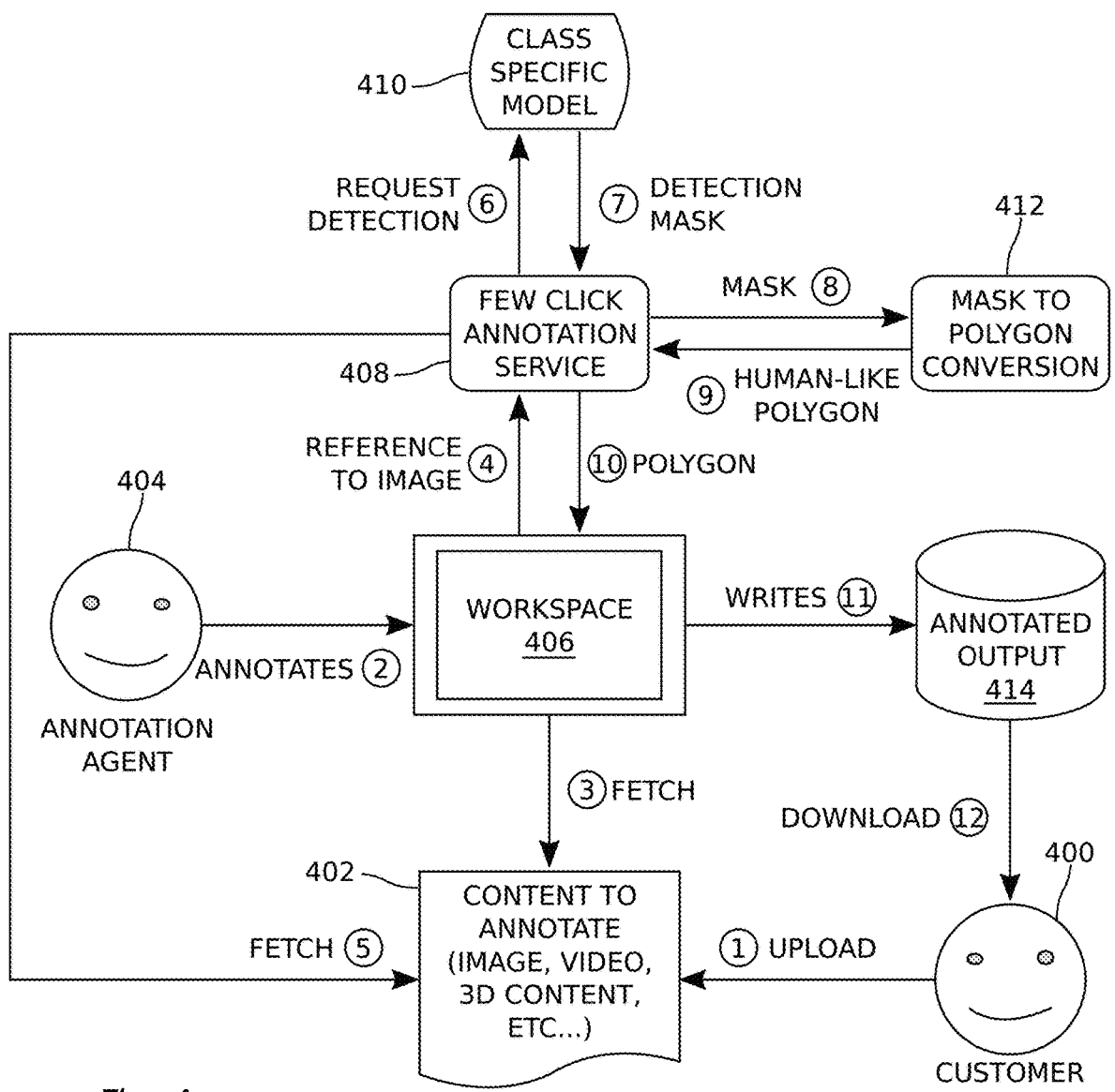
FIG. 4 is a schematic block diagram depicting the steps of converting raw data to an annotated output.

FIG. 4 is a schematic block diagram depicting the steps of converting raw data to an annotated output. In Step 1 a customer 400 uploads raw data content, such as 2D images, videos, or 3D point clouds into a shared repository 402. In Step 2 an annotation user (human agent) 404 requests access to an annotation workspace 406. In the context of FIG. 1, workspace 406 comprises the UI. In Step 3 the workspace 406 pulls content from the shared repository 402 and displays it to the user 404. In Step 4 the human agent 404 selects the annotation model (the few click annotation tool) 408 and selects key points for the object of interest (shape), creating a course boundary. In Step 5 the annotation model 408 fetches the customer content being annotated. In Step 6 that annotation model invokes a component 410 for a ML segmentation model for the region of interest, which is returned in Step 7. In Step 8 the annotation model 408 invokes a component 412 that creates the refined boundary polygon, which is returned in Step 9, and sent to the workspace 406 in Step 10 for display to the human agent 404. In Step 11 the human agent 404 makes modifications to the refined boundary, if necessary, and submits the corrected image to an output database 414. In Step 12 the customer 400 is able to retrieve the corrected image from the output database 414.

Although configured differently in the interest of simplicity, FIG. 1 as explained up to this point, includes substantially the same features as FIG. 4. Returning to FIG. 1, the system 100 further comprises a mediation software application 122 comprising a sequence of processor 124 executable steps stored in non-transitory memory 126 for calculating annotation efficiency. The mediation application 122 accepts the annotated images from the annotation model 102 and corresponding corrected images on line 104, and supplies an annotation model retraining resource analysis for the first shape in response to comparing the annotated and corrected images. As noted above, it is typical that the UI 112 provides the raw data images with the coarse boundaries on line 104, created by the human agent, to the annotation model 102. The UI receives the raw data images from a data repository 130 on line 104. In one variation, the annotation model includes as a component a ML segmentation model 132 accepting the first number of points added to the raw data image by the human agent, and adds segments connecting the points to create coarse boundaries with segments. The machine-assisted segmentation service 132 may be trained on customer data to automatically "segment" (i.e. draw the outline of the shape) by a human agent just entering, for example, 4 points around the shape. As another alternative, the repository 130 may provide the annotated images, for example, pre-annotated by a third party (e.g., customer).

In one aspect, the UI 112 accepts a plurality of raw data images on line 104 from repository 130 including undefined variations of a second shape and provides a shape commands for selecting the second shape for annotation on line 104. For example, the raw data may contain just second shapes of interest. Alternatively, the raw data may include both first and second shapes, but only the second shapes are to be annotated. The annotation model 102 accepts the raw data images and shape command (typically supplied from the UI 112), and supplies annotated images with annotation marks at the interface on line 104, where the annotation marks form a refined boundary surrounding the second shape variation. The UI 112 accepts human agent modifications to the refined boundaries surrounding the second shape and supplies corrected images, and the mediation application 122 provides an annotation model retraining resource analysis for the second shape in response to comparing the annotated and corrected images.

System 100 broadly represents any type single or multi-processor computing device or system capable of executing computer-readable instructions. Examples of computing system 100 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 100 may be programmed, configured, and/or otherwise designed to comply with one or more networking protocols. According to certain embodiments, computing system 100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 100 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Processor 124 generally represents any type or form of processing unit capable of processing data or interpreting and executing instructions. Processor 124 may represent an application-specific integrated circuit (ASIC), a system on a chip (e.g., a network processor), a hardware accelerator, a general purpose processor, and/or any other suitable processing element. As is common with most computer system, processing is supported through the use of an operating system (OS) 134 stored in memory 126.

System memory 126 generally represents any type or form of non-volatile (non-transitory) storage device or medium capable of storing data and/or other computer-readable instructions. Examples of system memory 126 may include, without limitation, Random Access Memory (RAM), Read Only Memory (ROM), flash memory, or any other suitable memory device. Although not required, in certain embodiments computing system 126 may include both a volatile memory unit and a non-volatile storage device. System memory 126 may be implemented as shared memory and/or distributed memory in a network device. Furthermore, system memory 126 may store packets and/or other information used in networking operations.

In certain embodiments, exemplary computing system 100 may also include one or more components or elements in addition to processor 124 and system memory 126. For example, computing system 100 may include a memory controller, an Input/Output (I/O) controller, and a communication interface (not shown), as would be understood by one with ordinary skill in the art. Further, examples of communication infrastructure include, without limitation, a communication bus 104 (such as a Serial ATA (SATA), an Industry Standard Architecture (ISA), a Peripheral Component Interconnect (PCI), a PCI Express (PCIe), and/or any other suitable bus), and a network. Note, that for simplicity the communication between devices in system 100 is shown as using bus line 104, although in practice the devices may be connected on different lines using different communication protocols.

In short, the mediation application 122 measures a duration of time used to create the refined boundaries. That is, the mediation application 122 measures the number of points changed in the refined boundaries to supply the corrected images, and the time required by the human agent to change the points. It is typical that the UI 112 accepts human agent modification from a plurality of human agents, in which case the mediation application 122 may compare annotated and corrected images, cross-referenced to each human agent. Further, the mediation application 122 may cluster human agents together based upon a selected characteristic, and compare annotated and corrected images based on shape and the selected characteristic. One example of a selected characteristic is human agent annotation experience.

In one aspect, the mediation application 122 creates annotation time regression parameters based upon shape over a first duration of time, which may be normalized by time per point change to create an annotation time series prediction. As shown in greater detail below, the mediation application 122 may grade predictions based upon factors including improved efficiency per first duration of time, consistent efficiency per first duration of time, and decreased efficiency per first duration of time, and provide the annotation model retraining resource analysis for the decreased efficiency predictions. Alternatively, it may be found that the efficiency of even improving or consistent efficiency models make justify the costs of retraining.

The mediation application 122 typically supplies the annotation model retraining resource analysis by comparing costs associated with retraining a current annotation model to the cost of human agents supplying the corrected images using the current annotation model. In one aspect, the mediation application 122 calculates a return on investment (ROI) by using the annotation time series prediction to determine a cost difference between using the current annotation model and a retrained annotation model, as amortized over the remaining annotation project, and comparing the cost difference to the cost of retraining the current annotation model. The remaining annotation project is the number of raw data images that still need to be annotated.

The annotation process used by an agent is as follows:
1. Agent loads content;
2. Agent reviews the annotation. If the content is pre-annotated, the atypical case, go to Step 4;
3. If not pre-annotated, the agent creates a course boundary, for example, by clicking on 4 corners of each object needing to be annotated;
4. The agent reviews the points (refined boundary) created by the annotation model and identifies defects;
5. If adjustments are required, the agent moves errant points to a more precise location (the point is now a key point).

The time to annotate a shape can be broken down into the following categories:
Step 3: Base time to annotate a shape at maximum efficiency (measured by the maximum observed model performance) (0 if pre-annotated). This time is independent of the model performance;
Step 5: Number of key points moved to adjust the shape;
Step 5: Time to move all key points for each object annotated
Step 5: The number of resulting interpolated points generated as a result of the adjustment, to provide a quality metric of the magnitude of the change. More interpolated points mean a more significant change was required. This can also be measured using relative coordinates changes when picture depth is known.

Therefore, the overall time to annotate can be represented as:

$$Tt = Ti + \sum_{n=0}^{m-1}\left(Tk(n) + \sum_{i=0}^{j-1} Ts(n, i)\right)$$

Where
Ti=Time for the initial semi-automated annotation;

Tk=Time spent moving a key point;
Ts=Time spent adjusting all subkey points;
m: The total number of key point adjusted; and,
j: The number of subpoints created and adjusted.

Model Performance

If semi-automated (using an ML model to create coarse boundary segments) or pre-annotated, the amount of human intervention in the annotation process is reduced. Therefore, model performance tends to try to reduce to:

$$\sum_{n=0}^{m-1} \left( Tk(n) + \sum_{i=0}^{j-1} Ts(n, i) \right)$$

Because the content provided by customers and annotation instruction received from customer varies, the efficiency of the model changes over time (generally degrades). This is called "Model Decay". To optimize performance, a model subject to model decay should be retrained. However, retraining a model is costly and, therefore, the model should only be retrained when the projected efficiency gain is greater than the cost to train the model, or in other words, when the return on investment (ROI) is greater than retaining costs.

Agent Performance Considerations: Extrinsic Factors

Because the annotation adjustments are done by humans, extrinsic factor may influence the overall system performance. Not all degradations of performance are linked to model performance, or vice-versa, not all improvements come from the automation. It is important to factor these in the ROI calculation to avoid either delayed or unnecessary model retraining. To identify these extrinsic factors, the clustering of agent performance may be used to reduce patterns dimensionality. Projections for each cluster are then calculated.

Agent Annotation Clustering

Agents control the overall output of the annotation. In the case of polygon annotation, the best annotation can be summarized as the most precise annotation, with the least amount of points in the polygon, done in the shortest amount of time possible. Therefore, the features used for agent clustering may be defined as:
  Total number of key points moved (from the pre-annotation, or semi-automated annotation);
  Total number of derived points added/removed;
  The QA scoring from the final approved task;
  Rework count;
  The QA scoring from the customer; and,
  Time to annotate.

Agent Performance Projections

In addition to clustering, some of the metrics above are also used to predict model performance over time. For each agent, the following metrics are collected and aggregated:
  Time to process shape, by shape type (a reference to the general taxonomy): as the time for annotation, grouped by shape type over a recurring timeframe (to reduce temporal factor, e.g., daily); and,
  Time to make adjustments collected as the overall time to annotate, minus the average time spent by this group to annotate shapes that do not require any adjustments (total number of key points moved=0 and/or total number of derived points added/removed=0) and did not require any rework (rework count=0).

Projections are calculated in a number of ways (linear, logarithmic, and exponential). The examples provided below limit analysis to a linear regression model. Practically, the model may be more complex, and involve an analysis scoring of customer data (using ML methodology).

Figure 5:
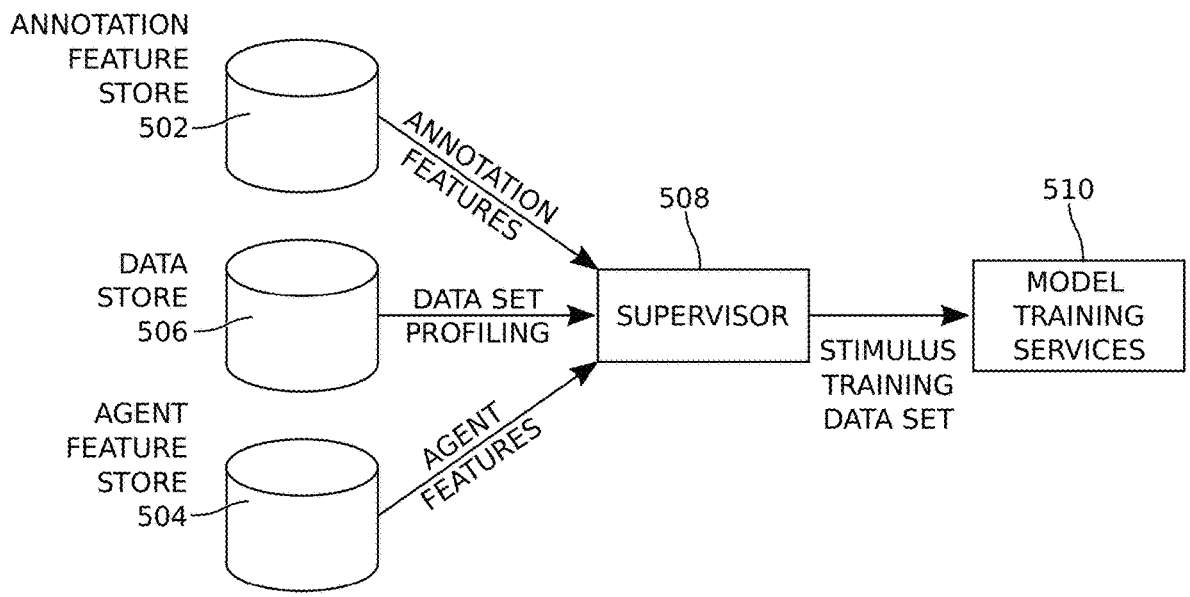
FIG. 5 is a schematic block diagram of mediation application enabled as a supervisor creating a model retraining stimulus.

FIG. 5 is a schematic block diagram of mediation application enabled as a supervisor creating a model retraining stimulus. The annotation feature store 502 is a structured data store (i.e. database) containing a number of input variables of the overall model performance monitoring data for a given project. The agent feature store 504 is a structured data store (i.e. database) containing a number of input variables covering the historical performance of the human agents. The datastore 506 is the storage system for customer raw data to be annotated. The supervisor 508 is the system aggregating the input data and applying logic to determine the performance status of a given model, and issuing a training request (the stimulus). The model training services 510 represent a model training pipeline receiving the request to train the model, the data to be trained on, and deployment policy/configuration.

Annotation features are a set of records from the annotation feature store 502 obtained via aggregating jobs and statistical analysis of features listed in the description of agent annotation clustering, above. Agent features are records collected from an agent's prior work, throughout their tenure in the company. The features are used by the supervisor to normalize the per share data with the typical performance of that user. The main record for normalization is the "agent efficiency coefficient" which is calculated as the average agent ranking in their prior team(s). The ranking is calculated as their position in their respective team weighted by the team size. In one aspect, a team smaller than 5 has the ranking set to 0.5.

For example, if agent "abc" worked on project P1, containing 40 agents, and was ranked as 24 out of 40, they would receive a 0.6 ranking. Agent "abc" now moves to project P2, containing 10 agents. They are now ranked 4 out of 10, with their ranking for this project being 0.4, and with an overall ranking of 0.56 (0.24×40+0.4×10)/50).

DataSet profiling is a set of features obtained from the customer dataset being processed and summarized as a score following a standard (DIQA) to group images by quality scores. Because poor quality images are harder to annotate, the agent performance is normalized based on the content the agent received. A stimulus is an event signaling to the training service 510 to begin a "training run". This is a simple message trigger containing the necessary information about the project targeted, referenced to the modelID in question (the model reference being used for the annotation assistance). The training dataset is a reference to a list of assets to be used by the model training services to adjust the model based on the new dataset. The training dataset list contains reference to assets that fall below the threshold during annotation and that required significant adjustment by the agent.

Figure 6:
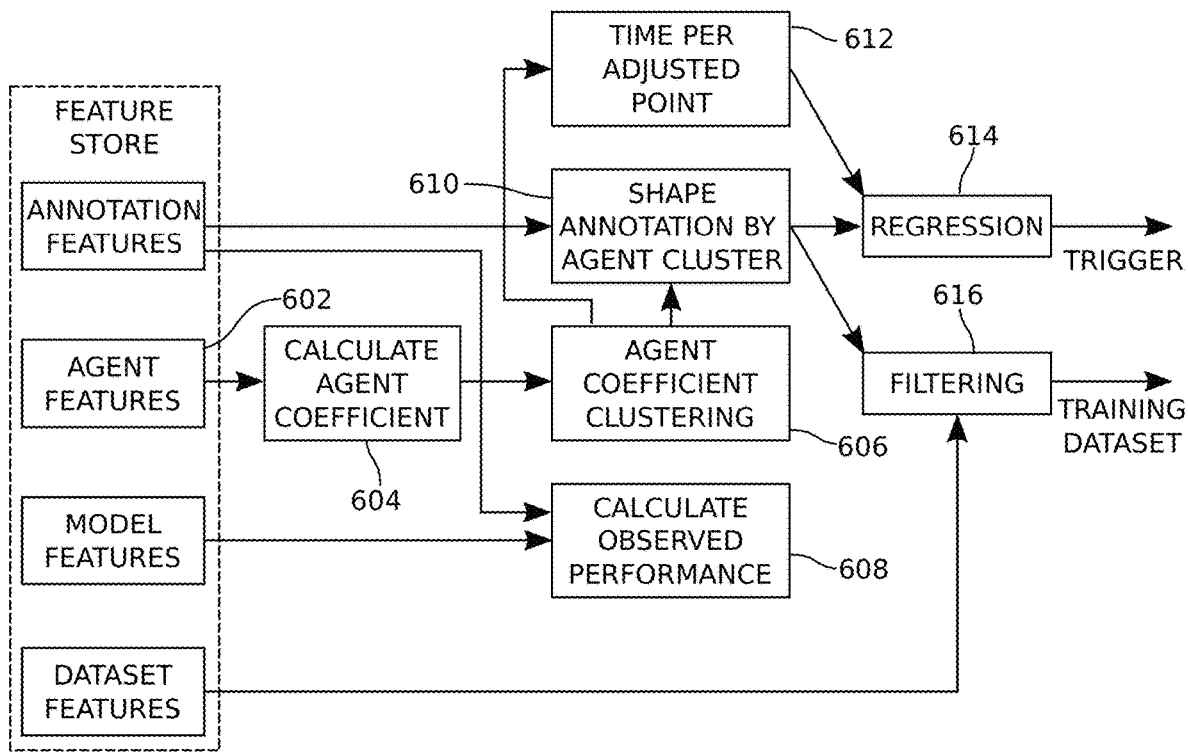
FIG. 6 is a schematic block diagram depicting the supervisor executing a sequence of evaluation calculations.

FIG. 6 is a schematic block diagram depicting the supervisor executing a sequence of evaluation calculations. As noted above, agent features 602 are records collected from an agent's prior work, throughout their tenure in the company. The features are normalized per share data with the typical performance of that user to create the agent efficiency coefficient 604, which is calculated as the average agent ranking in their prior team(s). With respect to agent coefficient clustering 606, agents move from project to project and it is possible that high ranking agents (per the agent coefficient calculation) may be in a learning phase. In addition to the overall ranking, the ranking for the object being annotated in the agent's current project must be considered.

An agent who obtained a positive ranking for a scene annotation (identifying day/night or weather) will not necessarily perform well annotating objects (shapes) such as cars and pedestrians. Therefore, in addition to the agent coefficient calculation, the total number of shapes annotated by the agent throughout their tenure must be considered, as well as the total number of shapes supported in the projects and models the agent has annotated throughout their tenure. Agents are clustered based upon the 3 features listed above.

As noted above, the calculation of model observed performance 608 for each agent is calculated based upon the time to process based on shape type 610 and the time to make adjustments 612 (minus the average time spent by a group to annotate shapes that do not require any adjustments). This calculation is required to determine if a complete departure occurred from what the model was originally trained on. For example, if a customer decides that tagging VRU (Vulnerable Road User) is not sufficient, then bicycle riders need to be separated from pedestrians. Then, classes from the last trained model can be compared to the features the last data set was annotated with. The result of data aggregation is represented as a series of annotation times—average by time intervals, and by Shape ID (taxonomy ID). Regression parameters 614 can then be calculated for each cluster by Shape ID.

Figure 7:
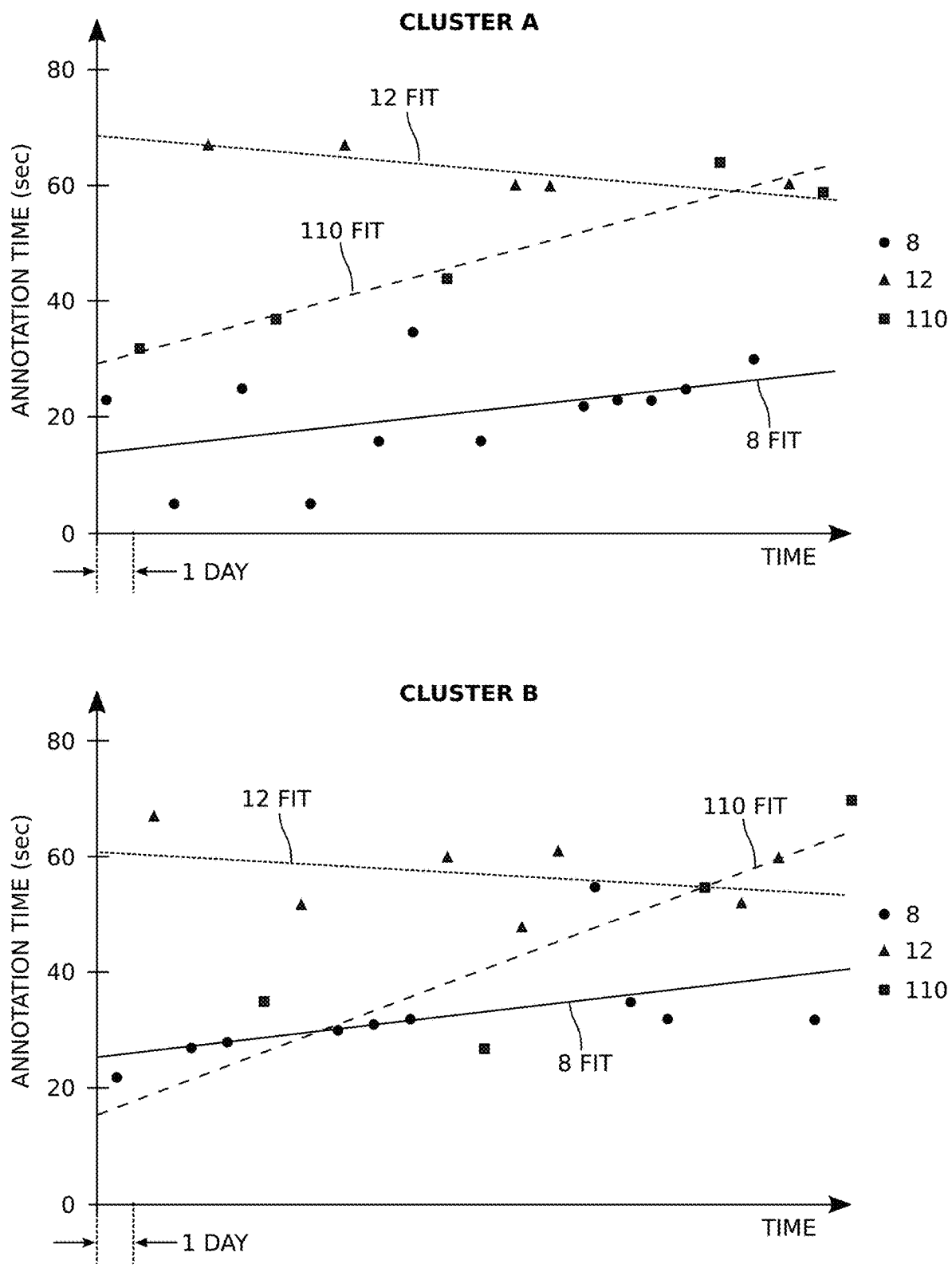
FIG. 7 shows regression parameter graphs depicting annotation time (in seconds) for three different ShapeIDs with respect to a recurrent timeframe for Clusters A and B.

FIG. 7 shows regression parameter graphs depicting annotation time (in seconds) for three different ShapeIDs with respect to a recurrent timeframe for Clusters A and B. In this example, the recurrent timeframe is daily, ShapeID 8 is an automotive vehicle, ShapeID 12 is a pedestrian, and ShapeID 110 is a bicycle. On the y axis is the average drawing time for a set of raw images, for a specific class (shape) in a time period. The x axis depicts successive time periods. In this example the time grouping is in increments of 1 day. The maximum value may be approximately 2 weeks, which varies based upon the volume of data being annotated. The legend on the right is the linear regression for each shape over time. The resulting slopes generally characterize the data point drawing time for each shape. As can be seen in this example, as time increases, the time to annotate increases for ShapeIDs 8 and 110. This increase may indicate a degradation of model performance, but it can also be due to other factors such as agent capacity or attention, the customer content changing and the shape might be more complex to annotate as time goes by, or annotation platform performance (response time). It can also be seen that for ShapeID 12, the degradation of performance is much more pronounced for Cluster B than for Cluster A. The two clusters may be differentiated, for example, on the basis of experience or cognitive abilities. As described below, a more advanced analysis of these data points can be made using a recurrent neural network (RNN).

Shape Level Point Annotation Performance Per Agent Cluster

If adjustments to an annotated image are needed, an agent supplies a corrected image by moving inferred points to refine the segmentation. The agent then may have to move one or many of these inferred points for accuracy. The points they move are called key points because they are presumably moved to a more accurate location, which is considered a new "anchor". The model is run again with the 4 initial points, plus the new key point(s). A new shape is created with a better fitting to the objects being annotated. This new inferred shape may include points added around the key point to refine the quality, for example, going around a car mirror: these are called interpolated points. In a blurry image, the agent might take time to identify which point should be adjusted, and while the adjustment may be minor, it may result in a long adjustment time.

Inversely, the rapid adjustment of multiple points is an indication of poor model quality. In a clear image, this factor may not necessarily show up in the shape annotation time. To address this issue the amount of time spent by the agent per modified point is determined. A low value indicates high model accuracy, and a high value indicates an important local accuracy problem.

Adjusted Points Calculation Per Agent Cluster

If the creation of the coarse boundaries is semi-automated, where an ML model joins agent created points with segments, part of the annotation time is required for the agent to create the initial set of points, and part should be minimized (the adjustments to the shape as a result of the segmentation model being imprecise).

The true impact of the model decay on the agent performance can now be determined. To make this determination, the shapes are identified that did not require adjustments ((total number of key points moved=0 and/or total number of derived points added/removed=0) and that did not require any rework (rework count=0)) (or default to the model accuracy metrics if we did not find anything). This time is subtracted from the overall time for shapes that were adjusted.

For example, if a shape took 30 seconds (s) to be annotated and 3 points were added, the time to annotate shapes is averaged with the same Shape ID without any adjustments or rework (21s in this case). This time is subtracted from the total annotation time (30 s) and divided the result by the number of points. In this case, 3 s/point ((30−21)/3=3 s per point). Now, the regression coefficients can be calculated for each trend line depicted in FIG. 7.

Figure 8:
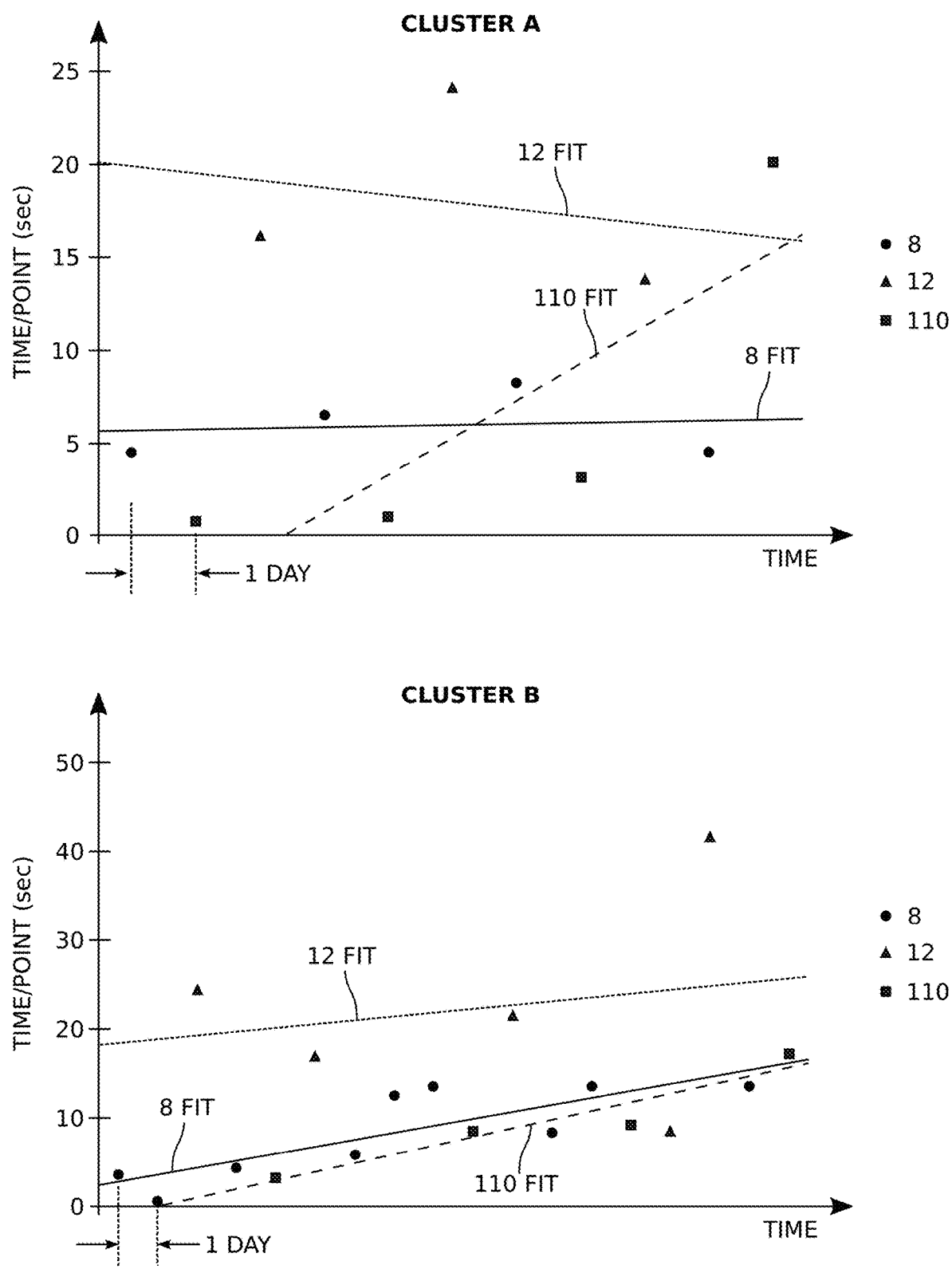
FIG. 8 shows annotation time series predictions depicting time per point generated (in seconds) for three different ShapeIDs with respect to a recurrent timeframe for Clusters A and B.

FIG. 8 shows annotation time series predictions depicting time per point generated (in seconds) for three different ShapeIDs with respect to a recurrent timeframe for Clusters A and B. At the point level, and adjusted for model efficiency, the regression coefficient projections give the true model performance degradation over time. Some models are trained for 1 particular shape, and others are trained for multiple ShapeIDs.

Using the graphs of FIG. 8, it can be determined if the model should be retrained. More explicitly, it can be determined if the costs associated with the degradation of performance outweigh the cost associated with training the new model (i.e., retraining the current model).

Regression Calculation

Retraining is logical if the projected costs of using the current annotation model are greater than (re) training costs. Projected costs are calculated as the cumulative cost associated with the annotation adjustment over a period of time (overhead due to model decay). The model training costs are estimated based on the last training time.

In a first step (pruning), the regression coefficients of FIG. 8 are organized into 3 categories: dropping slope (efficiency is improving), steady slope (efficiency is remaining the same), and increasing slope (efficiency is decreasing). The shapes that are potentially eligible for retraining are iteratively determined. All ShapeIDs with a negative regression coefficient within a pre-defined range are excluded (for example, + or −1.01 in the case of linear regression). In this example, ShapeID 12 is excluded since the slope in Cluster A is decreasing. Because agents in Cluster A are not showing any decreasing performance for ShapeID 12, any loss of accuracy in Cluster B cannot be caused by the model. If a regression coefficient slope in either Cluster A or Cluster B is Steady (e.g., ShapeID 8 in Cluster A), that ShapeID can also be excluded. Left is a list of ShapeIDs with various levels of degrading performance (increasing slope) across clusters. In this example, ShapeID 110 is left. The next step is to assess the inefficiency level and estimate the cost.

The second step is prediction/forecasting. This optimization algorithm may be resolved via a recurrent neural network (RNN). The adjusted point calculation per agent cluster is run through a pre-trained model to establish predictions across each cluster. Typically, annotation models are not trained from "scratch". Rather, the process is begun with a generic base model that was previously trained with a number of classes (shapes) and then fine-tuned for shapes of particular interest. Often the base models are trained with an opensource dataset, such as COCO, with internal data added to improve accuracy for the classes of interest. The predictions are then combined into a single aggregate projection and turned into a cost model. Alternatively, linear regression or a polynomial algorithm may be used. Once the RNN is run, a prediction is obtained for how the annotation time will likely progress over time (e.g., in the next few weeks). These numbers are applied to the annotation count (the number of objects annotated). The result is the total time spent doing annotation for a time period. The cost per hour (a known quantity) is multiplied by the projected time to annotate, to obtain the projected spend required to deliver the annotation. Once this number is known, a call can be made on what makes the most sense: spending for retraining or letting the current model run.

Figure 9:
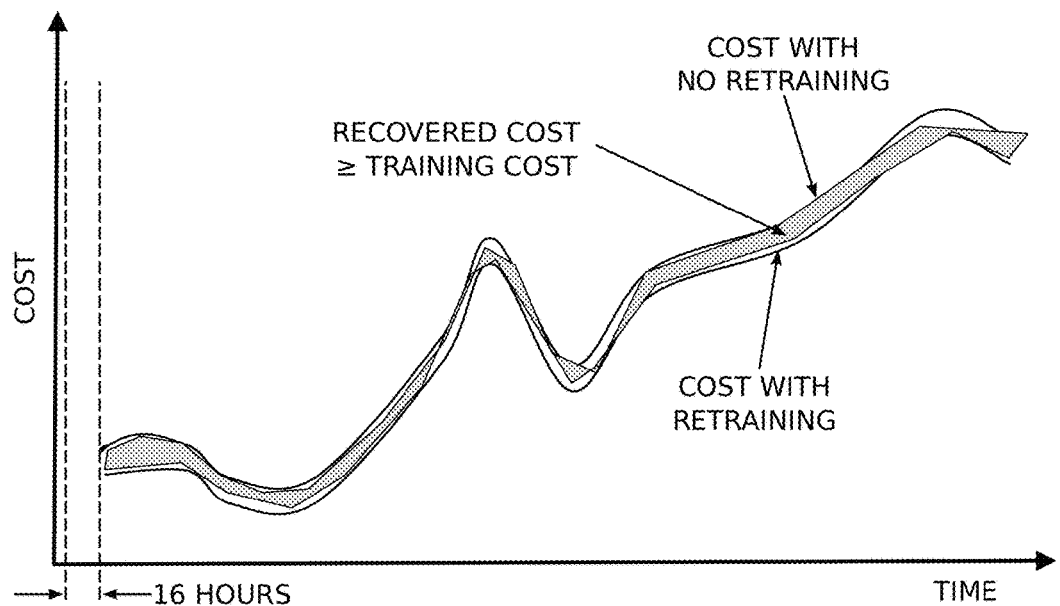
FIG. 9 is a graph depicting an analysis of return on investment.

FIG. 9 is a graph depicting an analysis of return on investment. A window algorithm can be used to calculate the ROI by determining the area between the unoptimized (current model) and optimized prediction (retrained model). This area has to be equal to, or greater than the training costs to justify retraining. As noted above, the ROI is calculated by using the predictions to determine the cost difference between using the current annotation model and a retrained model, as amortized over the remaining annotation project, and the cost difference is compared to the cost of the retraining. A retrained annotation model is assumed to have the same performance as the current model when it was originally trained, and this assumption is tested using a data validation set of annotated images. The training cost per hour is generally much higher than agent (manual) annotation time per hour (10× roughly). So 16 hours of retraining would require approximately 160 hours of saved agent time. Assuming a 5% improvement after training, it would take 4 weeks, for 20 agents, to justify retraining costs.

The data validation set is typically a subset of the overall training dataset. The data validation set includes images that have been isolated from the rest of the training data to act as a control group for accuracy measurements. For example, 90% of the dataset may be used for training and 10% used for validation. During training cycles, the model being trained is run against the validation set, and compared with the manual annotation of that dataset. Metrics are collected to show accuracy, false positives, etc.

The model costs are shown to increase over time based upon the assumptions that the raw data being used is shifting from the original data used for training or retraining. For example, if the retraining time is 16 hours on a machine that costs $20/hour, the total training time cost is $320. Practically, the model training time also includes factors such as the volume of data to train, the number of parameters in the model, and the type of annotation required.

To improve the retraining, a prioritized list of assets can be added as part of the stimulus (see filtering 616 in FIG. 6). To build the list, the initial annotation features are accessed (assetID) and ordered by the largest point adjustment time. The assets then run into an algorithm (e.g., DIQA, mentioned above) to remove like assets, and the final list is provided along with the stimulus.

Figure 10:
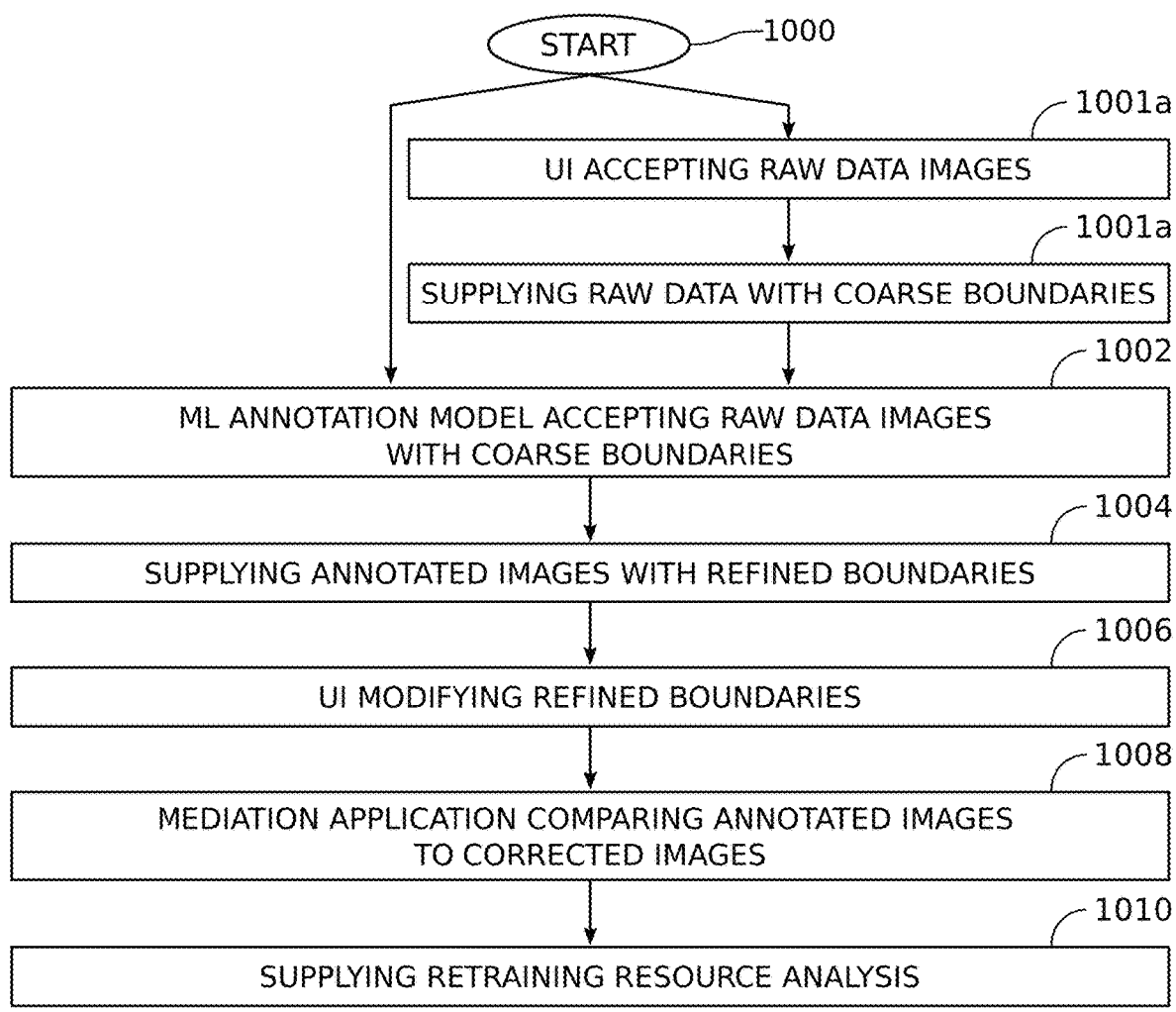
FIG. 10 is a flowchart illustrating a method for triggering ML annotation model retraining.

FIG. 10 is a flowchart illustrating a method for triggering ML annotation model retraining. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

In Step 1002*a* ML annotation model, comprising a sequence of processor executable steps and stored in a non-transitory memory, accepts a plurality of raw data images. Each raw data image includes an undefined variation of a first shape with a coarse boundary surrounding a first shape formed from a first number of points. Step 1004 supplies an annotated image with annotation marks forming a refined boundary surrounding the first shape with a second number of points greater than, or equal to the first number. In Step 1006*a* human agent user interface (UI) modifies the refined boundaries to supply corrected images. In Step 1008*a* mediation software application, comprising a sequence of processor executable steps stored in a non-transitory memory, compares the annotated images to corresponding corrected images. In Step 1010 the mediation application supplies an annotation model retraining resource analysis for the first shape in response to comparing the annotated images to the corrected images.

In one aspect, in Step 1001*a* the UI accepts a plurality of raw data images, and in Step 1001*b* the UI supplies the raw data images with the coarse boundaries surrounding the first shape to the annotation model. Alternatively, Step 1002 accepts raw data images with the first number of points and adds segments connecting the points to create the coarse boundaries with segments. In another aspect, Step 1002 accepts pre-annotated images. For example, a customer (third party) may provide roughly pre-annotated content that is to be refined. This might be done when a model in production is not preforming properly. In that case, the ROI is determined and the analysis sent to the customer so that they can retrain the model if necessary.

In one variation, accepting the raw data images in Step 1002 includes the annotation model accepting a plurality of raw data images including undefined variations of a second shape, with shape commands for selecting the second shape for annotation. Then, supplying the annotated images in Step 1004 includes the annotation model supplying annotated images with annotation marks forming a refined boundary surrounding the second shape variation. Step 1006 includes the UI supplying corrected images for the second shape and in Step 1010 the mediation application supplies retraining resource analysis for the second shape in response to comparing the annotated images to the corrected images.

In another aspect, comparing the annotated images to the corrected images in Step 1008 includes the mediation application measuring the number of points changed in the refined boundaries to supply the corrected images, and the time required by the human agent to change the points. Typically, Step 1006 includes the UI supplying modifications to corresponding annotated images from a plurality of human agents, and in Step 1008 the mediation application compares the annotated images to the corrected images, cross-referenced to each human agent.

More explicitly, comparing annotated images to the corrected images in Step 1008 includes the mediation application comparing the annotated images to the corrected images, cross-referenced to human agents clustered together based upon a selected characteristic such as general annotation experience, annotation experience with a particular shape, age, cognitive ability, sex, or geographic region to name a few examples. The mediation application creates annotation time regression parameters based upon shape, as measured over a first duration of time. Further, the regression parameters can be processed to create annotation time series predictions based upon shape over the first duration of time, normalized by time per point change. Then, the predictions can be graded based upon factors including improved efficiency per first duration of time, consistent efficiency per first duration of time, and decreased efficiency per first duration of time, and Step 1010 supplies annotation model retraining resource analysis for the decreased efficiency predictions.

More explicitly, Step 1010 may include the mediation application supplying the retraining resource analysis by calculating an ROI retraining resource analysis by using the annotation time series prediction to determine a cost difference between using the current annotation model and a retrained annotation model, as amortized over a remaining annotation project, and comparing the cost difference to the cost of retraining the current annotation model.

A system and method have been provided for triggering ML annotation model retraining. Examples of particular message structures, method steps, and hardware units have been presented to illustrate the invention. However, the invention is not limited to merely these examples. Other variations and embodiments of the invention will occur to those skilled in the art.

We claim:

1. A system for triggering machine learning (ML) annotation model retraining, the system comprising:
 a ML annotation model software application stored in a non-transitory memory and enabled as a sequence of processor executable steps, the annotation model having an interface to accept a plurality of raw data images, each raw data image including an undefined variation of a first shape with a coarse boundary surrounding the first shape formed from a first number of points, the annotation model concatenating a heatmap from colors within the coarse boundary, matching the heatmap to a selected segmentation model, converting the selected segmentation model into annotation marks, and providing an annotated image with the annotation marks at an interface, where the annotation marks form a refined boundary surrounding the first shape with a second number of points greater than, or equal to the first number;
 a human agent user interface (UI) comprising a display having an interface to accept and present the annotated images, and a device accepting human agent modifications to the refined boundaries to supply corrected images; and,
 a mediation software application comprising a sequence of processor executable steps stored in a non-transitory memory for calculating annotation efficiency, the mediation application having an interface to accept the annotated images and corresponding corrected images, and an interface supplying an annotation model retraining resource analysis for the first shape in response to comparing the annotated and corrected images.

2. The system of claim 1 wherein the raw data images with the coarse boundaries are provided to the annotation model by an element selected from the group consisting the UI or a third party.

3. The system of claim 1 wherein the mediation application measures a duration of time used to create the refined boundaries.

4. The system of claim 3 wherein the mediation application measures the number of points changed in the refined boundaries to supply the corrected images, and the time required by the human agent to change the points.

5. The system of claim 4 wherein the UI accepts a plurality of raw data images including undefined variations of a second shape and provides a shape commands for selecting the second shape for annotation;
 wherein the annotation model accepts the raw data images and shape command, and supplies annotated images with annotation marks at an interface, where the annotation marks form a refined boundary surrounding the second shape variation;
 wherein the UI accepts human agent modifications to the refined boundaries surrounding the second shape, supplying corrected images; and,
 wherein the mediation application supplies an annotation model retraining resource analysis for the second shape in response to comparing the annotated and corrected images.

6. The system of claim 5 wherein the UI accepts human agent modifications from a plurality of human agents; and,
 wherein the mediation application compares annotated and corrected images, cross-referenced to each human agent.

7. The system of claim 6 wherein the mediation application clusters human agents together based upon a selected characteristic, and compares annotated and corrected images based on shape and the selected characteristic.

8. The system of claim 7 wherein the mediation application creates annotation time regression parameters based upon shape over a first duration of time.

9. The system of claim 8 wherein the mediation application creates an annotation time series prediction based upon shape over a first duration of time, normalized by time per point change.

10. The system of claim 9 wherein the mediation application grades annotation time series predictions based upon factors including improved efficiency per first duration of time, consistent efficiency per first duration of time, and decreased efficiency per first duration of time, and provides the annotation model retraining resource analysis for the decreased efficiency predictions.

11. The system of claim 10 wherein mediation application supplies the annotation model retraining resource analysis by comparing costs associated with retraining a current annotation model to the cost of human agents supplying the corrected images using the current annotation model.

12. The system of claim 11 wherein the mediation application calculates a return on investment (ROI) by:
 using the annotation time series prediction to determine a cost difference between using the current annotation model and a retrained annotation model, as amortized over a remaining annotation project; and,
 comparing the cost difference to the cost of retraining the current annotation model.

13. The system of claim 1 wherein the annotation model accepts the raw data images with the first number of points, and adds segments connecting the points to create coarse boundaries with segments.

14. A method for triggering machine learning (ML) annotation model retraining, the method comprising:
- a ML annotation model, comprising a sequence of processor executable steps and stored in a non-transitory memory, accepting a plurality of raw data images, each raw data image including an undefined variation of a first shape with a coarse boundary surrounding the first shape formed from a first number of points;
- supplying an annotated image with annotation marks forming a refined boundary surrounding the first shape with a second number of points greater than, or equal to the first number;
- a human agent user interface (UI) modifying the refined boundaries to supply corrected images;
- a mediation software application, comprising a sequence of processor executable steps stored in a non-transitory memory, comparing the annotated images to corresponding corrected images by measuring the number of points changed in the refined boundaries to supply the corrected images, and the time required by the human agent to change the points; and, the mediation application supplying an annotation model retraining resource analysis for the first shape in response to comparing the annotated images to the corrected images.

15. The method of claim 14 further comprising:
the UI accepting a plurality of raw data images; and,
the UI supplying the raw data images with the coarse boundaries surrounding the first shape to the annotation model.

16. The method of claim 14 further comprising:
the UI accepting a plurality of raw data images; and,
wherein accepting the raw data images with the coarse boundaries includes accepting raw data images with the first number of points and adding segments connecting the points to create coarse boundaries with segments.

17. The method of claim 14 wherein accepting the raw data images includes accepting a plurality of raw data images including undefined variations of a second shape, with shape commands for selecting the second shape for annotation;
- wherein the annotation model supplying the annotated images includes the annotation model supplying annotated images with annotation marks forming a refined boundary surrounding the second shape variation;
- wherein the UI modifying the refined boundaries includes the UI supplying corrected images for the second shape; and,
- wherein the mediation application supplying the annotation model retraining resource analysis includes the mediation application supplying retraining resource analysis for the second shape in response to comparing the annotated images to the corrected images.

18. The method of claim 14 wherein UI modifying the refined boundaries includes the UI supplying modifications to corresponding annotated images from a plurality of human agents; and,
wherein the mediation application comparing annotated images to the corrected images includes the mediation application comparing the annotated images to the corrected images, cross-referenced to each human agent.

19. The method of claim 18 wherein the mediation application comparing annotated images to the corrected images includes the mediation application comparing the annotated images to the corrected images, cross-referenced to human agents clustered together based upon a selected characteristic selected from the group consisting of general annotation experience, annotation experience with a particular shape, age, cognitive ability, sex, and geographic region.

20. The method of claim 19 wherein the mediation application comparing annotated images to the corrected images includes the mediation application creating annotation time regression parameters based upon shape, as measured over a first duration of time.

21. The method of claim 20 wherein the mediation application creating the regression parameters includes the mediation application creating an annotation time series prediction based upon shape over the first duration of time, normalized by time per point change.

22. The method of claim 21 wherein the mediation application creating the annotation time series prediction includes the mediation application grading annotation time series predictions based upon factors including improved efficiency per first duration of time, consistent efficiency per first duration of time, and decreased efficiency per first duration of time, and supplying the annotation model retraining resource analysis for the decreased regression coefficient predictions.

23. The method of claim 22 wherein mediation application supplying the annotation model retraining resource analysis includes the mediation application supplying a return on investment (ROI) retraining resource analysis by using the annotation time series prediction to determine a cost difference between using the current annotation model and a retrained annotation model, as amortized over a remaining annotation project, and comparing the cost difference to the cost of retraining the current annotation model.

24. A system for triggering machine learning (ML) annotation model retraining, the system comprising:
- a mediation software application comprising a sequence of processor executable steps stored in a non-transitory memory for calculating annotation efficiency, the mediation application having an interface to accept ML annotation model annotated images and corresponding corrected images, and an interface supplying an annotation model retraining resource analysis for a first shape in response to comparing the annotated and corrected images;
- wherein the mediation application measures the number of points changed in the refined boundaries to supply the corrected images and the time required by a cluster of human agents to change the points, creates an annotation time series prediction based upon the first shape over a first duration of time, normalized by time per point change, and compares costs associated with retraining a current annotation model to the cost of human agents supplying the corrected images using the current annotation model.

25. The system of claim 24 wherein the mediation application calculates a return on investment (ROI) by:
- using the annotation time series prediction to determine a cost difference between using the current annotation model and a retrained annotation model, as amortized over a remaining annotation project; and,
- comparing the cost difference to the cost of retraining the current annotation model.

* * * * *